(12) United States Patent
Ford et al.

(10) Patent No.: US 7,518,624 B2
(45) Date of Patent: Apr. 14, 2009

(54) SYSTEM AND METHOD FOR MODULAR DISPLAY

(75) Inventors: Jeremy M. Ford, Austin, TX (US);
Jeffrey Thelen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 581 days.

(21) Appl. No.: 11/040,951

(22) Filed: Jan. 21, 2005

(65) Prior Publication Data
US 2006/0164325 A1 Jul. 27, 2006

(51) Int. Cl.
*G09G 5/00* (2006.01)
*H04N 5/64* (2006.01)

(52) U.S. Cl. .................. 345/905; 345/903; 348/839

(58) Field of Classification Search .................. 345/903, 345/904, 905; 348/839, 552, 706, 725, 211.99; 340/815.4, 815.47
See application file for complete search history.

(56) References Cited

U.S. PATENT DOCUMENTS

| | | | |
|---|---|---|---|
| 5,079,636 A | 1/1992 | Brody | 358/241 |
| 5,262,759 A | 11/1993 | Moriconi et al. | 345/30 |
| 6,285,343 B1 | 9/2001 | Brody | 345/1 |
| 6,847,411 B2 | 1/2005 | Pan et al. | 348/839 |
| 7,009,637 B2 * | 3/2006 | Sawachi | 348/211.99 |
| 7,046,310 B2 | 5/2006 | Lee | 348/836 |
| 7,064,672 B2 * | 6/2006 | Gothard | 340/815.4 |
| 2001/0030657 A1 | 10/2001 | Hamon | 345/660 |
| 2002/0186329 A1 * | 12/2002 | Tong et al. | 348/839 |
| 2003/0112380 A1 | 6/2003 | Lee et al. | 348/836 |
| 2003/0192950 A1 | 10/2003 | Muterspaugh | 235/472.01 |
| 2004/0096187 A1 * | 5/2004 | Lee | 386/46 |
| 2004/0165119 A1 | 8/2004 | Choi et al. | 345/30 |

FOREIGN PATENT DOCUMENTS

| | | |
|---|---|---|
| JP | 4324492 | 4/1991 |
| JP | 07264519 A2 | 10/1995 |
| KR | 2002-0088836 | 11/2002 |
| KR | 2004-00522292 | 6/2004 |

* cited by examiner

*Primary Examiner*—Kevin M Nguyen
(74) *Attorney, Agent, or Firm*—Hamilton & Terrile, LLP; Robert W. Holland

(57) ABSTRACT

A modular display system and method assembles an external interface module with a display module to support built-to-order display configurations. The display module has display panel, timing controller and speaker components assembled in a display module housing that accepts a single LVDS and a single audio interface. The external interface module couples to the display module housing to form an integral display system. Selective assembly of the display system from plural types of external interface modules allows selective configuration of the display system with various television and information handling system display functionalities, such as to fill a purchaser order in a build-to-order manufacturing process.

10 Claims, 3 Drawing Sheets

SYSTEM AND METHOD FOR MODULAR DISPLAY

BACKGROUND OF THE INVENTION

1. Field of the Invention

The present invention relates in general to the field of information handling system displays, and more particularly to a system and method for display of information by modular components.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with a number of peripherals to communicate, print, display or otherwise process information. For instance, cathode ray tube (CRT) and, more recently, flat panel displays, such as liquid crystal display (LCD) and plasma displays, present information generated by information handling systems and communicated to the display through standardized cables, such as VGA or DVI cables. In the past, information handling systems typically generated display information with greater resolution than was available from conventional televisions. However, the advent of high definition television (HDTV) has brought about a convergence of information handling system display technology with television display technology. Flat panel LCD and plasma televisions are now commonly available that present digitally-rendered information with much of the same technology as is found in information handling system displays. However, flat panel televisions typically have highly-integrated architectures for processing and displaying information. As a result, flat panel televisions are built to then-current display performance, broadcast and connectivity standards with little flexibility to adjust to developments in standards after release of the television. Further, users typically respond to television failure by purchase of a new television with updated system performance rather than an attempt to fix the failure. By contrast, information handling system displays tend to rely on processing by an information handling system to produce high quality displays and are less prone to failure. Thus, despite the similarities between flat panel information handling system displays and flat panel televisions, information handling system displays typically do not integrate television components.

The information handling system industry has made some efforts to integrate television components with information handling system displays to provide television functions through the displays. One example of the display of television signals through an information handling system display is by converting the signals through a TV card of an information handling system. However, converted signals tend to have a lower quality due to interference introduced in the conversion process. Other available solutions attempt to add television functionality to information handling system displays with separate add-on modules, or vice versa. For instance, Samsung offers a modular television tuner that interfaces with a SyncMaster TFT LCD to allow the display to meet different broadcast standards. Another example is the Pioneer PDA5002 Video Option Card, which enables video input to commercial plasma displays. AverMedia sells a separate box that interfaces with an LCD monitor to provide TV functionality as a plug-and-play multimedia entertainment center with or without an information handling system. Television manufacturers have attempted to add information handling system interfaces to televisions, such as Scientific Atlanta, which sells a set top box that interfaces a television or a display with a cable to present television signals. Each of these solutions offers only piecemeal convergence of information handling system and television displays, and are often greeted by user confusion in interfacing the separate components.

SUMMARY OF THE INVENTION

Therefore a need has arisen for a system and method which converges information handling system and television displays with an integrated yet modular architecture.

In accordance with the present invention, a system and method are provided which substantially reduce the disadvantages and problems associated with previous methods and systems for enabling information handling system displays to present television information. A display system is assembled from a display module and a separate external interface module to allow selection by a purchaser of desired external audiovisual interfaces for the display system. Plural types of external interface modules each translate audiovisual information to a common single audio signal and a common single visual signal so that assembly of an external interface module having desired external interfaces will configure a display system to present information received with the external interfaces.

More specifically, display systems are built-to-order to support desired television external interfaces and/or information handling system external interfaces. Plural types of external interface modules are built with each type translating selected of plural external interfaces to a common format, such as LVDS. For instance, external interfaces are selected from the group consisting of analog and/or digital television tuners, composite video, S-video, component video, VGA, DVI and audio interfaces. A purchaser selects desired external interfaces for a display system, which is manufactured by assembling the type of external interface module associated with the purchaser-selected interfaces to a display module to form a contiguous display system. Thus, the same display module may be configured to perform television or information handling system functions based on the functions included in the external interface module. If the external interface module fails after delivery to the purchaser, a replacement external interface module is sent as a replacement unit instead of replacing the entire display system.

The present invention provides a number of important technical advantages. One example of an important technical advantage is that flat panel displays are selectively configured for regional and time-to-market flexibility to support multiple markets and product tiers. Selection of an appropriate external interface module allows build-to-order user configurations for improved user experience and reduced manufacturing expense. Component failure or display failure are managed separately by replacement of the external interface module or flat panel display as appropriate for reduced expense associated with repair of failed systems. Flat panel displays are designed and manufactured with up-to-date display performance, broadcast standard and connectivity configurations by spanning external interface modules and/or flat panel displays across product tiers and generations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Convergence of television and information handling system displays is provided by the modular assembly of separate display components and external interface components into an integral display system that selectively supports television or information handling system display functions based on the included external interface components. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1A:
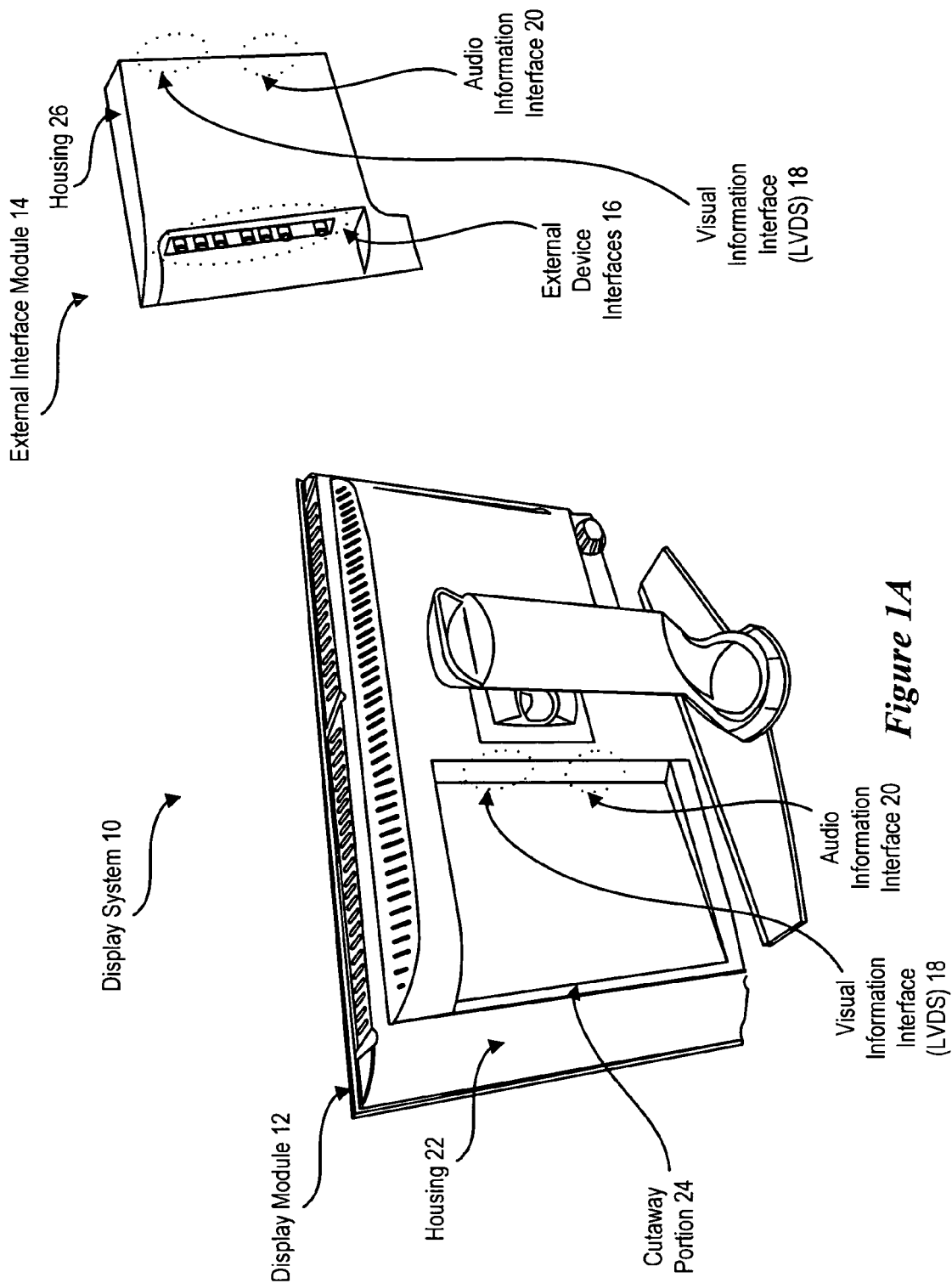
FIG. 1A depicts a display module and an external interface module aligned for assembly.
Figure 1B:
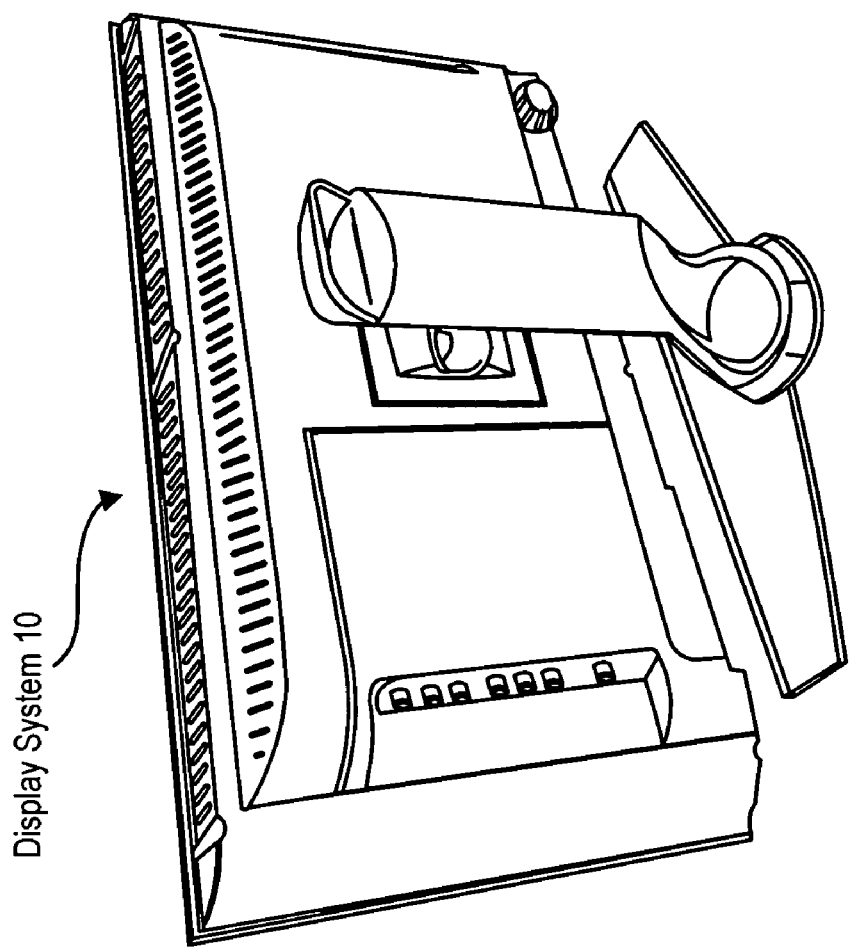
FIG. 1B depicts the display module and the external interface module assembled as an integral unit.

Referring now to FIGS. 1A and 1B, a display system 10 is depicted having a display module 12 separate from an external interface module 14 for assembly as an integral unit having desired television and/or information handling system display functions. Display module 12 includes components for generating a visual display of information while external interface module 14 includes components that accept visual information from external sources, such as an information handling system or a television signal, and provide the visual information to the display module for generation of a visual image. The types of external interfaces supported by display system 10 are configured by selection of an external interface module 14 having external device interfaces 16 and associated components to receive to the desired external signals. External interface module 14 translates the visual information to a single common visual information interface 18, such as a low voltage differential signal (LVDS), and a single audio information interface 20. Display module 12 has a housing 22 with a cutaway portion 24 sized to accept the housing 26 of external interface module 14. External interface module housing 26 fits into cutaway portion 24 to couple to display module housing 22 as a contiguous unit, as is depicted by FIG. 1B.

Display system 10 supports selected of plural external interfaces by selection of an external interface module 14 with the selected external interfaces. Build-to-order configuration of display systems 10 is supported by offering to purchasers plural different sets of external interfaces, such as various combinations of television interfaces, like television tuner, composite, S-video, or component interfaces, and information handling system interfaces, like VGA or DVI interfaces. Different types of external interface modules 14 are built to support each available combination of external interfaces. When a customer purchase order is received for a display system 10 that has selected external interfaces, an external interface module 14 supporting the selected external interfaces is assembled to a display module 12 and the "built-to-order" display system 10 is shipped to the purchaser. For instance, if a purchaser wants only a television, display system 10 is configured with an external interface module 14 that has television external interface components selectable by the purchaser, such as various combinations of tuner components, composite video components, S-video components and/or component video components. If a purchaser wants only an information handling system display, display system 10 is configured with an external interface module 14 that has information handling system external interface components selectable by the purchaser, such as various combinations of VGA and/or DVI components. Alternatively, a display system 10 may be selectably configured as both a television and an information handling system display with selection of an external interface module having various combinations of television and information handling system components. If the display system fails, the purchaser is simply shipped a replacement external interface module 14 having a similar configuration that takes the place of the existing external interface module.

Figure 2:
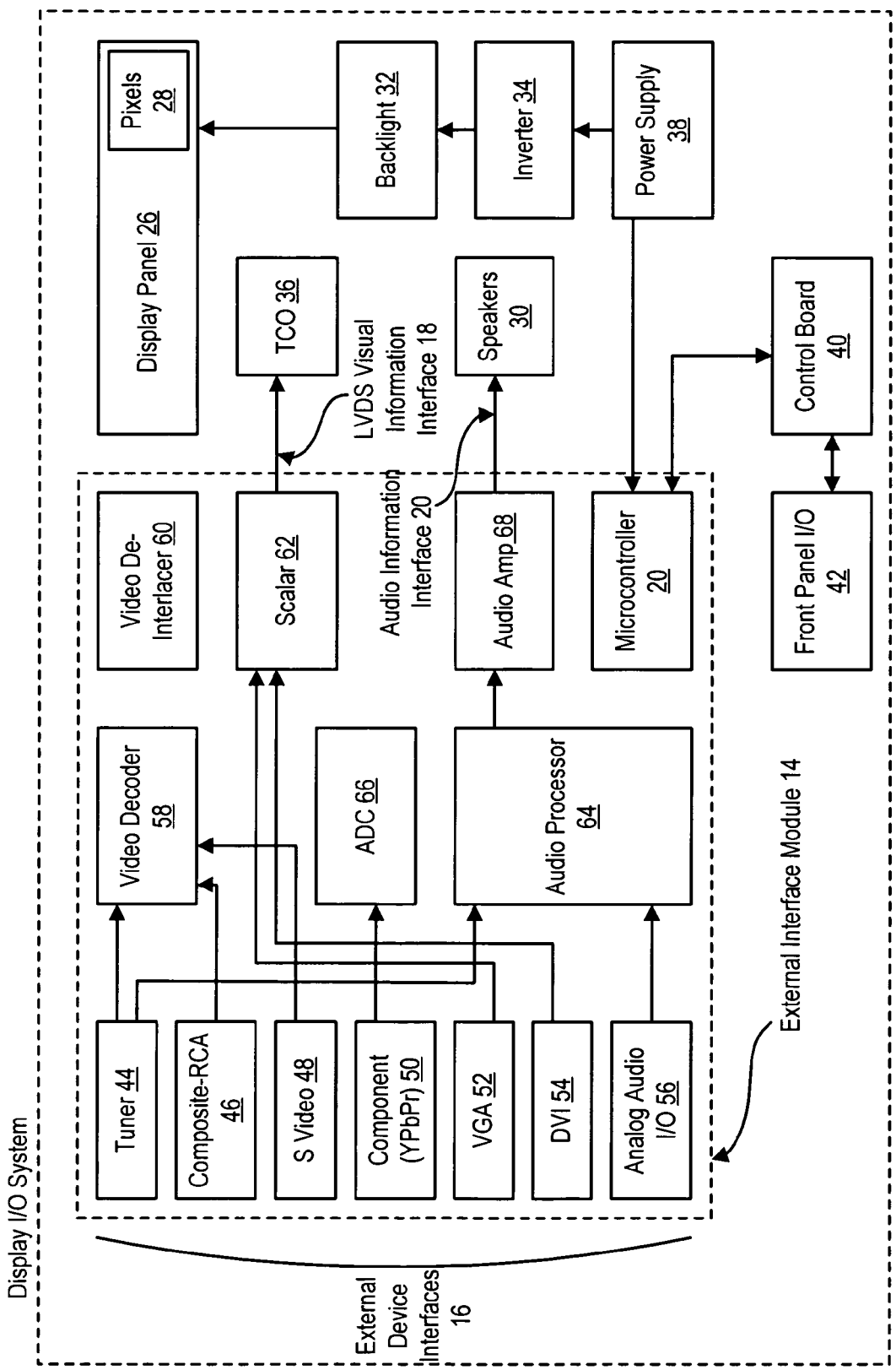
FIG. 2 depicts a functional block diagram of one embodiment of the display module and the external interface module.

Referring now to FIG. 2, a functional block diagram of one embodiment of a display system 10 having a separate display module 12 and external interface module 14 is depicted. Display module 12 presents visual information with a display panel 26 that has plural pixels 28 organized in rows and columns, and presents audio information with speakers 30. Speakers 30 may be integrated in the display module housing or may be detachable such as with an extension wire connection. Display panel 26 is a LCD panel illuminated with a backlight 32 powered by an inverter 34, although in an alternative embodiment display panel 26 is a plasma panel. A timing controller TCO 36 illuminates pixels 28 in rows and columns to present a visual image in accordance with visual information provided by visual information interface 18, such as visual information in the LVDS format. A power supply 38 provides power to operate the components of display module 12 under management of a control board 40 and in response to user inputs through a front panel interface 42. For instance, command and control information captured by an IR receiver of front panel interface 42 from a remote control is provided to microcontroller 20 from control board 40. Thus, display module 12 includes the components to support present visual information through a single visual information interface 18 and to present audio information through a single audio information interface 20 but lacks the "intelligence" to receive visual information in various television or information handling system formats.

External interface module 14 provides display module 12 with the "intelligence" to receive selected of plural types of audiovisual information based upon the configuration of the external interface module assembled to the display module. In the embodiment depicted by FIG. 2, external device interfaces 16 supported by external interface module 14 include television interfaces of tuner 44, composite video 46, S-video 48 and component video 50, as well as information handling system interfaces of VGA 52, DVI 54 and individual audio inputs 56. In alternative embodiments, external interface module 14 is selectably configurable to support desired of the external device interfaces depicted by FIG. 2 or other external device interfaces. Analog visual signals, such as analog television signals from tuner 44, composite video 46 and S-video 48 are provided to a video decoder 58 and video de-interlacer 60 for conversion to visual information by scalar 62. Digital visual signals, such as from high definition television tuner 44, component video 50, VGA 52 and DVI 54, are provide to scalar 62 either directly or through an analog-digital converter 66 as appropriate. Scalar 62 generates a single visual information output, such as LVDS, for each of the types of external interface modules 14 to ensure compatibility with display module 12. Audio signals are provided to an audio processor 64 and audio amp 68 to produce a single audio signal output usable by speakers 30 for audio compatibility. A microcontroller 70 manages operation of the components of external interface module 14, such as delivery of power from power supply 38 and translation of user inputs from control board 40. By translating external audiovisual information with selected components into a single common video and single common audio signal, external interface module 14 allows selective configuration of a display module for television and/or information handling system usage.

Although the present invention has been described in detail, it should be understood that various changes, substitutions and alterations can be made hereto without departing from the spirit and scope of the invention as defined by the appended claims.

What is claimed is:

1. A system for presentation of audiovisual information, the system comprising:
   a display module housing having a cutaway portion;
   a display panel disposed in the display module housing and operable to present visual information as pixels organized in rows and columns;
   a timing controller disposed in the display module housing and interfaced with the display panel, the timing controller operable to communicate visual information to the rows and columns;
   speakers associated with the display module housing and operable to present audio information as sounds;
   an external interface module housing sized to fit in the cutaway portion as an integral unit, the external interface module having a single visual information interface positioned proximate the cutaway portion to interface with the timing controller and having a single audio information interface positioned proximate the cutaway portion to interface with the speakers; and
   an external interface module disposed in the external interface module housing, the external interface module having external visual interface components operable to receive external visual information and communicate the visual information to the single visual information interface and having external audio interface components operable to receive external audio information and communicate the audio information to the single audio information interface.

2. The system of claim 1 further comprising:
   a power supply disposed in the display module housing and operable to supply power to the display panel, timing controller and speakers; and
   a power interface disposed in the display module housing at the cutaway portion operable to provide power from the power supply to the external interface module.

3. The system of claim 1 wherein the external visual interface components comprise a television tuner.

4. The system of claim 1 wherein the external visual interface components comprise component video processing components.

5. The system claim 1 wherein the external visual interface components comprise DVI component processing components.

6. The system of claim 1 wherein the single visual information interface comprises an LVDS interface.

7. The system of claim 1 wherein the external visual interface components comprise one more components selected by a purchaser of the system from the group of television tuner components, composite video components, S-video components, and component video components.

8. The system of claim 7 wherein the visual interface components further comprise one or more components selected by a purchaser of the system from the group of VGA components and DVI components.

9. The system of claim 1 wherein the display panel is a LCD panel.

10. The system of claim 1 wherein the display panel is a plasma display.

* * * * *